US008600750B2

(12) United States Patent
Ramalho et al.

(10) Patent No.: US 8,600,750 B2
(45) Date of Patent: Dec. 3, 2013

(54) SPEAKER-CLUSTER DEPENDENT SPEAKER RECOGNITION (SPEAKER-TYPE AUTOMATED SPEECH RECOGNITION)

(75) Inventors: Michael A. Ramalho, Sarasota, FL (US); Todd C. Tatum, San Jose, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 735 days.

(21) Appl. No.: 12/795,959

(22) Filed: Jun. 8, 2010

(65) Prior Publication Data
US 2011/0301949 A1    Dec. 8, 2011

(51) Int. Cl.
*G10L 15/06* (2013.01)
(52) U.S. Cl.
USPC .......................................... 704/245; 704/235
(58) Field of Classification Search
USPC ........................................ 704/235, 242–245
See application file for complete search history.

(56) References Cited

U.S. PATENT DOCUMENTS

| | | | |
|---|---|---|---|
| 4,903,305 A * | 2/1990 | Gillick et al. | 704/245 |
| 5,983,178 A * | 11/1999 | Naito et al. | 704/245 |
| 6,107,935 A * | 8/2000 | Comerford et al. | 704/246 |
| 6,122,613 A | 9/2000 | Baker | |
| 6,151,575 A | 11/2000 | Newman et al. | |
| 6,567,776 B1 * | 5/2003 | Chang et al. | 704/236 |
| 7,698,140 B2 | 4/2010 | Bhardwaj et al. | |
| 7,801,838 B2 * | 9/2010 | Colbath et al. | 706/20 |
| 2007/0038449 A1 | 2/2007 | Coifman | |
| 2009/0048830 A1 * | 2/2009 | Roy | 704/235 |
| 2009/0326939 A1 * | 12/2009 | Toner et al. | 704/235 |

OTHER PUBLICATIONS

"A Linguistically-Informative Approach to Dialect Recognition Using Dialect-Discriminating Context-Dependent Phonetic Models", Chen et al., 2010.

* cited by examiner

*Primary Examiner* — Abul Azad
(74) *Attorney, Agent, or Firm* — Tucker Ellis LLP

(57) ABSTRACT

In an example embodiment, there is disclosed herein an automatic speech recognition (ASR) system that employs speaker clustering (or speaker type) for transcribing audio. A large corpus of audio with corresponding transcripts is analyzed to determine a plurality of speaker types (e.g., dialects). The ASR system is trained for each speaker type. Upon encountering a new user, the ASR system attempts to map the user to a speaker type. After the new user is mapped to a speaker type, the ASR employs the speaker type for transcribing audio from the new user.

20 Claims, 2 Drawing Sheets

SPEAKER-CLUSTER DEPENDENT SPEAKER RECOGNITION (SPEAKER-TYPE AUTOMATED SPEECH RECOGNITION)

TECHNICAL FIELD

The present disclosure relates generally to automated speech recognition (ASR).

BACKGROUND

Traditional ASR generally has three broad Automated Speech Recognition (ASR) categories: 1) speaker independent ASR, 2) speaker dependent ASR, and 3) speaker-adaptive ASR. Speaker independent ASR does not involve the user training the system in any form. Although named "speaker independent", generally these systems categorize the speaker as male or female (males and females generally have much different vocal tract and vocal cord physiology and therefore produce sounds that are characteristically male or female). After this characterization additional process is usually performed to normalize the result to a "nominal male" or "nominal female" characteristic (this process is called speaker normalization). Although both of these categorizations are generally performed, they are done so without user intervention or knowledge and therefore this type of ASR system is characterized as "speaker independent" ASR.

For speaker dependent ASR, the system is trained to recognize how a particular user pronounces words/phrases/phonemes. In general, these systems have higher performance than speaker independent systems and therefore are more desirable when higher confidence ASR is desired. However, speaker dependent systems require the user to "train/teach" the ASR how they pronounce phonemes (or di-phones, or tri-phones—whatever the phonetic unit of the particular ASR design is). The training involves each user dictating a precise text to the ASR system. Depending on the system design, this text may or may not be the same text for all users—but such text will generally have the property that it has a balanced set of phonemes (or the phonetic units used by the system) and that the relative frequency of the phonemes is within a certain bound defined by the system training design. Thus speaker dependent ASR has the advantage in the training stage of having both the audio and the "text transcription" of the audio—because the user has read the text.

Most speaker adaptive ASR systems (e.g., DRAGON SYSTEMS) have an optional stage where they can first train to a particular user by having the user read a text and perform speaker dependent ASR training. Whether or not such an optional step is used, speaker adaptive ASR depends on the user "watching the ASR generated text transcription of their spoken words" and then "correcting the mistakes" the ASR system makes in real time. Whenever the system is instructed to correct its ASR output by the user (an "ASR mistake"), the system learns the characteristics of this "mistake" and "adapts its understanding" as to how that particular user pronounces words. In this way it modifies its future decoding of similar words/phonemes in an attempt not to make the same "mistake" again. An ASR system learning in this way is called a "speaker adaptive" ASR system. Thus, this type of ASR is also dependent on having a "text transcript" (in this case it's the ASR output corrected by the user) and the "audio" to obtain performance improvement.

In general, both speaker dependent and speaker adaptive ASR performs better than speaker independent ASR owing to having both the "user audio" and the "transcription" of the spoken utterances for a particular individual. However, both require users to train the system for this ASR performance improvement.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
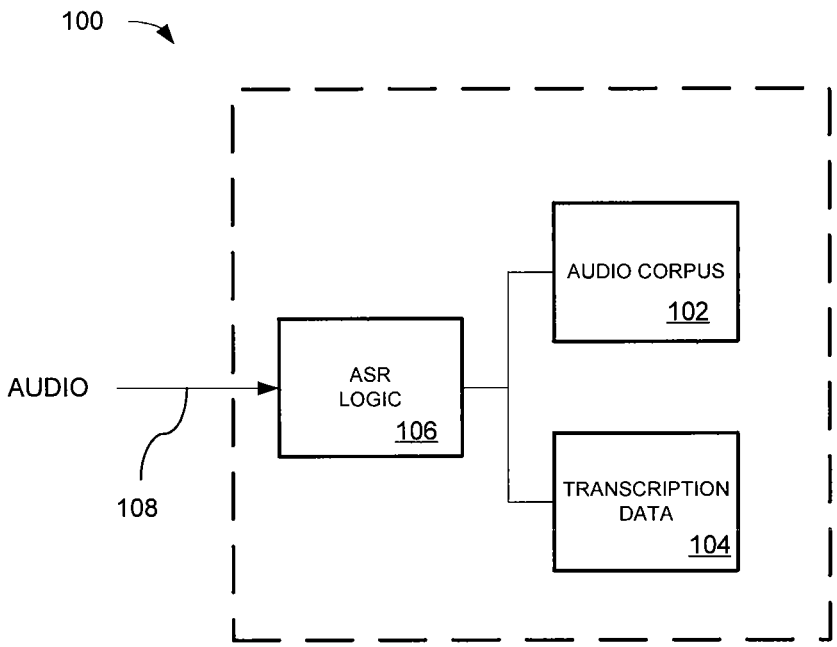
FIG. 1 is a block diagram illustrating an example of an automated speech recognition system.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment, there is disclosed herein an automatic speech recognition (ASR) system that employs speaker clustering for transcribing audio. A large corpus of audio with corresponding transcripts is analyzed to determine a plurality of speaker types (e.g., dialects, also referred to herein as speaker clusters). The ASR system is trained for each speaker type. Upon encountering a new user, the ASR system attempts to map the user to a speaker type. After the new user is mapped to a speaker type, the ASR employs the speaker type for transcribing audio from the new user.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, "clustering technology" is employed to analyze a very large audio corpus and the corresponding "human assisted" transcription of the recordings in the corpus to identify (e.g., classify) people into classes (e.g., dialects). For example a cluster will form for those people from Austria (who swap Vs and Ws owing to German pronunciation rules and who often replace "th" with "z" because they don't have that sound in their language), the New Englanders (who often replace an ending "a" with an "r"—"idea" becomes "i-deer"—"Jessica" becomes "Jessiker", etc.), the nuances of "valley speech" (e.g., for Southern Californians) and so on for other found clusters. The clustering system may not classify clusters as labeled above (e.g., German Speakers, New Englanders, and/or Valley Speech) but may use any suitable classification means (e.g., Group 1, Group 2 . . . and/or Group A, Group B, etc.). In an example embodiment, the clustering system groups people with similar pronunciations of words. Each cluster may also be referred to herein as a "speaker type". Thus a "very large corpus" in this context is a corpus large enough to cover the expected or desired number of speaker types in a statistically meaningful way. Any suitable self-organizing clustering algorithm may be employed to identify clusters without human intervention. An aspect of an example embodiment described herein is that the clustering algorithm automatically determines phonetic units of sound (e.g., phonetic combinations) that one speaker type pronounces significantly differently than other speaker types.

In an example embodiment, a large voice database may be employed to find such clusters. Once an arbitrary person has been classified into one or a small number of speaker known speaker types, the person's speech may be transcribed employing the speaker type(s) associated with that person. This is similar to the male/female classification in a speaker independent system, but with a much higher granularity based on speaker type.

A potential benefit of cluster-dependent ASR is that it may catch some nuances that may be missed by speaker dependent training. Speaker dependent training is limited by the training text length and may not "catch" some of the nuances contained in the larger cluster-dependent utterances. Zipf's law states that the importance of a word is inversely proportional to the frequency of use. Thus "difficult word mappings" for a given speaker type may never be exposed by the training of a particular user, but would likely be uttered somewhere in larger speaker cluster databases used in training a cluster-dependent ASR system.

In an example embodiment, an ASR system begins by "Speaker clustering" on a sufficiently large speech corpus to identify the appropriate or expected number of the clusters in a given language. It is expected that a self-organizing clustering technique will form an appropriate number of clusters and that this number of clusters will approximately be the number of dialects represented in the speech corpus (for a given language). In an example embodiment, a human assisted voicemail database (e.g., with audio and the transcripts for the audio) can be employed to help identify the appropriate number of clusters for the self-organizing algorithm to begin with (as most clustering algorithms require a rough estimate of the number of clusters expected).

An ASR is trained for each "speaker type" by using all the speech (and transcripts) of a given speaker type. For example, when a New Englander says the phonemes "i-deer", it automatically maps to the word "idea" as the most likely spoken word. In an example embodiment, the subset of the corpus used has a phonetic balance similar to the training sentences used in speaker dependent ASR training.

When a new user enters the system (his/her first call), speaker independent ASR is employed. If the confidence is sufficiently low, humans can assist in the transcript creation. It should be noted that new utterances and their associated transcripts from the new user become a part of the (ever-growing) corpus.

When there is enough audio to classify the new user as a particular "speaker type", cluster-dependent ASR is employed. Humans may assist in the transcript creation if the resultant confidence is low.

FIG. 1 is a block diagram illustrating an example of an automated speech recognition (ASR) system 100. ASR system 100 comprises an audio corpus 102 (e.g., stored audio data which may be in digital, analog or in any suitable form), transcription data 104 corresponding to the audio corpus, and ASR logic 106 coupled to audio corpus 102 and transcription data 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, automatic speech recognition logic 106 is operable to determine a plurality of speaker clusters corresponding to a plurality of speaker types (e.g., dialects) from the audio corpus 102 and transcription data 104. Automatic speech recognition logic 106 is trained for each speaker cluster belonging to the plurality of speaker clusters. The training may be based on words, phrases, and sub-words such as phonemes, di-phones, tri-phones or any combination thereof. Similarly, automatic speech recognition logic 106 may employ words, phrases, sub-words such as phonemes, di-phones, tri-phones or any combination thereof to determine speaker clusters. In an example embodiment, audio corpus 102 and transcription data 104 may be obtained from a voice mail system (not shown).

In an example embodiment, when automatic speech recognition logic 106 receives audio (e.g. from an input such as input 108) from a source (e.g., an unknown source, a new user or a source that has not yet been mapped to a speaker cluster), automatic speech recognition logic determines a selected speaker cluster selected from the plurality of speaker clusters for a source responsive to receiving audio data and a transcription of the audio data for the source. Upon determining the selected speaker cluster for the source, automatic speaker recognition logic 106 employs the selected speaker cluster for transcribing audio from the source. In an example embodiment, speaker independent automatic speech recognition is employed by automatic speaker recognition logic 106 to transcribe audio for the source until one or a small number of likely speaker types for the new user is determined.

Figure 2:
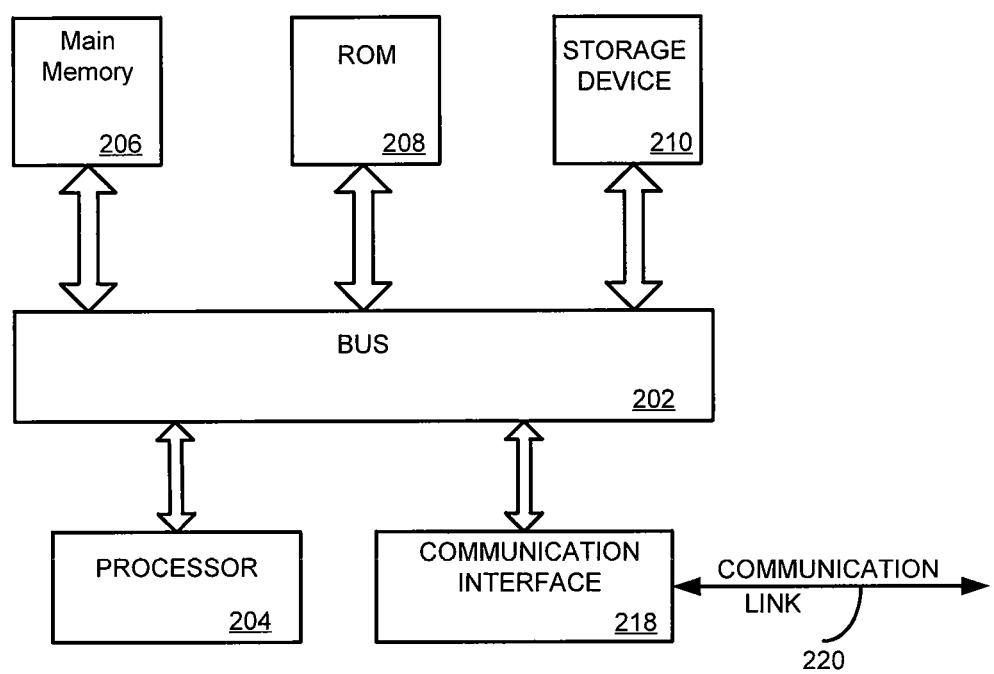
FIG. 2 is a block diagram illustrating a computer system upon which an example embodiment may be implemented.

FIG. 2 is a block diagram illustrating a computer system 200 upon which an example embodiment may be implemented. Computer system 200 can be employed to perform the functionality of ASR logic 106 (FIG. 1) described herein. Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

An aspect of the example embodiment is related to the use of computer system 200 for speaker-cluster dependent speech recognition (also referred to herein as speaker-type ASR). According to an example embodiment, speaker-cluster dependent speech recognition is provided by computer system 200 in response to processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any tangible medium that participates in providing instructions to processor 204 for execution. Such a tangible medium may take many forms, including but not limited to non-volatile media, and volatile media. Non-volatile media include for example optical or magnetic disks, such as storage device 210. Volatile media include dynamic memory such as main memory 206. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other tangible medium from which a computer can read.

Computer system 200 also includes a communication interface 218 coupled to bus 202. Communication interface 218 provides a two-way data communication coupling computer system 200 to a communication link 220. Communication link 220 enables computer system 200 to obtain audio and/or transcription data from external devices via a network, telecommunications, or other communications link. Communications link 220 may also be employed to receive audio signals for transcription. Communication link 220 may suitably comprise wired, wireless, or both wired and wireless links.

Figure 3:
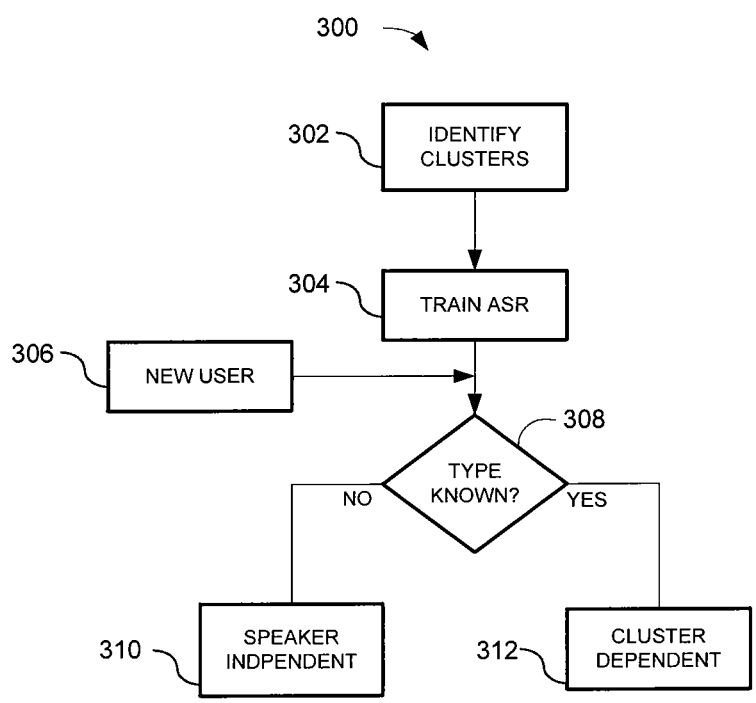
FIG. 3 is a block diagram illustrating an example of a methodology for performing automatic speech recognition.

In view of the foregoing structural and functional features described above, a methodology 300 in accordance with an example embodiment will be better appreciated with reference to FIG. 3. While, for purposes of simplicity of explanation, methodology 300 of FIG. 3 is shown and described as executing serially, it is to be understood and appreciated that the example embodiment is not limited by the illustrated order, as some aspects could occur in different orders and/or concurrently with other aspects from that shown and described herein. Moreover, not all of the illustrated features may be required to implement a methodology in accordance with an aspect of an example embodiment. Methodology 300 described herein is suitably adapted to be implemented in hardware, software, or a combination thereof. Methodology 300 may be implemented by ASR logic 106 (FIG. 1) and/or processor 204 (FIG. 2).

At 302, speaker clusters are identified from a corpus of audio with corresponding transcription data. In an example embodiment, a plurality of speaker types is determined. Each cluster identifies a speaker type, e.g., a dialect. Note that the number of clusters (i.e., speaker types or found dialects) can change over time as the audio corpus grows. The number of speaker types typically grows to a number representative of the number of dialects found in the corpus.

At 304, an automatic speech recognition system is trained for each speaker type. For example, when a New Englander says the phonemes "i-deer" it is automatically mapped to the word "idea" as the most likely spoken word. The training may be enhanced or optimized based on predetermined words, predetermined phrases, sub-words, phonemes, di-phones, tri-phones or any combination thereof.

At 306, audio is received from a source such as a new user. At 308, a determination is made from audio and transcribed data of the audio whether the new user can be mapped to one or more likely speaker cluster(s). If there is not sufficient data (e.g., not enough transcribed audio) to determine a speaker cluster for the new user (NO), at 310 speaker independent speech recognition is employed to transcribe audio data from the new user until a speaker cluster corresponding to the new user's speaker type can be determined. If, however, at 308, one or more speaker cluster(s) for the new user can be determined (YES), at 312 cluster dependent speech recognition is employed to transcribe audio for the user. Once a best speaker cluster is determined for a user, that cluster can be used for future audio transcriptions. As used herein, a "best speaker cluster" is the speaker cluster that offers the highest recognition performance over all other candidate speaker types. In an example embodiment, the audio data and corresponding transcription data may be periodically, or aperiodically, analyzed to identify additional speaker clusters and train the automatic speech recognition system accordingly. In addition, sources of audio data (e.g. users, speakers, etc.) may be re-evaluated to determine whether they should be moved into a different speaker cluster.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   an audio corpus;
   transcription data corresponding to the audio corpus;
   automatic speech recognition logic coupled with an associated interface for receiving the audio corpus and the associated interface for receiving transcription data;
   wherein the automatic speech recognition logic is operable to analyze the audio corpus and the transcription data corresponding to the audio corpus to determine a plurality of speaker clusters corresponding to a plurality of speaker types from the audio corpus and the transcription data corresponding to the audio corpus;
   wherein the automatic speech recognition logic is trained for each speaker cluster belonging to the plurality of speaker clusters;
   wherein the automatic speech recognition logic is operable to determine a selected speaker cluster selected from the plurality of speaker clusters for an associated source responsive to receiving audio data and a transcription of the audio data from the associated source; and
   wherein the automatic speech recognition logic employs the selected speaker cluster for transcribing the audio from the associated source.

2. The apparatus of claim 1, wherein the automatic speech recognition logic selectively employs speaker independent automatic speech recognition to transcribe the audio from the associated source until the selected speaker type for the new user is determined.

3. The apparatus of claim 1, wherein predetermined words are employed to train the automatic speech recognition logic.

4. The apparatus of claim 1, wherein predetermined sub-words are employed to train the automatic speech recognition logic.

5. The apparatus of claim 4, wherein the predetermined sub-words comprises phonemes.

6. The apparatus of claim 4, wherein the predetermined sub-words comprises di-phones.

7. The apparatus of claim 4, wherein the predetermined sub-words comprises tri-phones.

8. The apparatus of claim 1, wherein the automatic speech recognition employs predetermined phrases for training.

9. The apparatus of claim 1, wherein the audio corpus and transcription data corresponding to the audio corpus are received from a voice mail system.

10. A method, comprising:
    analyzing, by an automatic speech recognition system, a corpus of audio data and transcription data corresponding to the corpus of audio data to determine a plurality of speaker types from the corpus of audio data and the corresponding transcription data;
    training the automatic speech recognition system for each of the plurality of speaker types;
    receiving audio data from an associated new user;
    determining a selected one of the plurality of speaker types based on the audio data received from the associated new user and a transcription of the audio received from the associated new user by the automatic speech recognition system; and
    transcribing, by the automatic speech recognition system, the audio data received from the associated new user based on the selected one of the plurality of speaker types.

11. The method of claim 10, further comprising selectively transcribing, by the automatic speech recognition system, the audio data received from the associated new user employing speaker independent transcription until the selected one of the plurality of speaker types is determined.

12. The method of claim 10, wherein training the automatic speech recognition system is at least partially based on predetermined words.

13. The method of claim 10, wherein training the automatic speech recognition system is at least partially based on predetermined phrases.

14. The method of claim 10, wherein training the automatic speech recognition system is at least partially based on sub-words.

15. The method of claim 14, wherein the sub-words comprise phonemes.

16. The method of claim 14, wherein the sub-words comprises one of a group consisting of di-phones and tri-phones.

17. The method of claim 10, further comprising re-evaluating the plurality of speaker types;
    wherein re-evaluating includes audio data from the new user and transcribed audio data from the new user.

18. Logic encoded on tangible non-transitory media for execution by a processor, and when executed operable to:
    analyze a corpus of audio data and transcription data corresponding to the audio data to determine a plurality of speaker types from the corpus of audio data and the corresponding transcription data;
    train for automatic speech recognition of each of the plurality of speaker types;
    receive audio data from an associated source;
    determine a selected one of the plurality of speaker types based on the audio data received from the associated source and a transcription of the audio received from the associated source; and
    selectively transcribe the audio data received from the associated source based on the selected one of the plurality of speaker types.

19. The logic according to claim 18, wherein the logic is further operable to selectively transcribe the audio data received from the associated source using speaker independent automatic speech recognition until the selected one of the plurality of speaker types is determined.

20. The logic of claim 18, wherein logic is further operable to:
    re-determine speaker types from the corpus of audio data and corresponding transcription data;
    re-train the automatic speech recognition; and
    re-determine the speaker type for the source.

* * * * *